United States Patent [19]
Cherry et al.

[11] Patent Number: 5,235,315
[45] Date of Patent: Aug. 10, 1993

[54] SELF TEST FOR OBSTACLE DETECTION SYSTEM

[75] Inventors: James R. Cherry, Windham, N.H.; Abel Raynus, Brookline; David P. Stevens, Billerica, both of Mass.

[73] Assignee: Armatron International, Inc., Melrose, Mass.

[21] Appl. No.: 818,236

[22] Filed: Jan. 2, 1992

[51] Int. Cl.⁵ ............................................. B60Q 1/00
[52] U.S. Cl. ............................... 340/435; 340/436; 340/903; 340/514; 342/92; 367/13
[58] Field of Search ............... 340/435, 436, 903, 904, 340/514, 522; 342/91, 92; 367/13, 909

[56] References Cited

U.S. PATENT DOCUMENTS

| | | | |
|---|---|---|---|
| 4,001,823 | 1/1977 | Matsui et al. | 340/435 |
| 4,257,703 | 3/1981 | Goodrich | 340/903 |
| 4,326,273 | 4/1982 | Vancha | 367/909 |
| 4,412,211 | 10/1983 | Lautzenheiser et al. | 340/514 |
| 4,551,722 | 11/1985 | Tsuda et al. | 340/904 |
| 4,561,064 | 12/1985 | Brüggen | |
| 4,618,948 | 10/1986 | Sakakibara et al. | |
| 4,694,295 | 9/1987 | Miller et al. | |
| 4,766,421 | 8/1988 | Beggs et al. | |
| 4,910,512 | 3/1990 | Riedel | |
| 5,059,946 | 10/1991 | Hollowbush | 340/903 |
| 5,077,548 | 12/1991 | Dipoala | 340/522 |

OTHER PUBLICATIONS

"Automotive Radar: A Brief Review" by Dale M. Grimes, Proceedings of the IEEE, vol. 62, No. 6, Jun. 1974.

Primary Examiner—Donnie L. Crosland
Assistant Examiner—Nina Tong
Attorney, Agent, or Firm—Samuels, Gauthier & Stevens

[57] ABSTRACT

An object detection system and method for detecting the presence of objects in the path of a vehicle, and in which includes a self test operation. The system includes a transmitter which transmits object detection signals and a receiver which receives reflections of the transmitted object detection signals. A controller is provided for adjusting the gain and signal threshold of the receiver so that the receiver initially is able to detect reflections from irregularities in the ground surface. Once the receiver receives a signal reflected from the ground surface, an indication is provided that the system is in a ready or operable state. Thereafter, the controller adjusts the receiver gain and signal detection threshold so that signals reflected from the ground surface are effectively ignored and only signals reflected from significant objects in the path of the vehicle are detected. An alarm signal is generated in response to the receiver receiving signals reflected from the object. The system may continuously repeat the cycle of alternating between a self test mode and a object detection mode, or intermittently alternate between the self test mode and object detection mode.

51 Claims, 4 Drawing Sheets

SELF TEST FOR OBSTACLE DETECTION SYSTEM

BACKGROUND OF THE INVENTION

The invention relates to object detection systems in general and, more particularly, to an object detection system and method with a self test operation.

Various object detection systems have been proposed to warn drivers of the presence of an object in the path of a movable vehicle. Typically, such warning system provide a suitable warning signal either audible or visual or both, upon detecting the presences of an object in the path of the moving vehicle.

In consideration of the importance of the operability of such object detection systems, it is often desirable for such systems to include self testing capabilities. For example, the co-pending U.S. patent application Ser. No. 07/758,244, now U.S. Pat. No. 5,160,927 issued to Cherry et al. describes an object detection system with a self test feature wherein object detection signals transmitted by the transmitter are received directly by the receiver for a self test check. Another object detection system with a self test feature is described in U.S. Pat. No. 4,910,512 issued to Riedel, in which signals provided by a transmitter are reflected by acoustic shunts or acoustic reflectors for reception by a receiver for self testing purposes. Furthermore, U.S. Pat. No. 4,561,064 to Bruggen et al. describes an object detection system with a self test feature in which a fixed reflector located on a vehicle reflects signals from the transmitter to the receiver to evaluate the system.

Conventional object detection systems with self testing capabilities represented by the above disclosures are dependent upon the use of signal reflectors being attached to the vehicle and/or the positioning of the transmitter and receiver on the vehicle so that parts of the vehicle do not interfere with the testing signals being transmitted from the transmitter to the receiver. Such systems may be undesirable due to the need for additional structures such as reflecting elements to be attached to the vehicle, and because the systems may require specific positioning of the transmitter and receiver in order to avoid transmission interference caused by preexisting structures on the vehicle.

It is accordingly an object of the present invention to provide an object detection system with a self test operation which does not require additional reflecting elements associated with the vehicle and/or specific positioning of the transmitter and receiver in order to avoid interference caused by preexisting structures on the vehicle.

It is a specific object of the present invention to provide an object detection system which operates to periodically adjust the system gain and/or detection threshold in order to allow the detection of low level signals reflected from irregularities in the ground surface which are used to self test the system.

SUMMARY OF THE INVENTION

The present invention provides an object detection system and method for detecting the presence of objects in the path of a vehicle, and in which includes a self test operation. The system includes a transmitter which transmits object detection signals and a receiver which receives reflections of the transmitted object detection signals. A controller is provided for adjusting the gain and signal threshold of the receiver so that the receiver initially is able to detect reflections from irregularities in the ground surface. Once the receiver receives a signal reflected from the ground surface, an indication is provided that the system is in a ready or operable state. Thereafter, the controller adjusts the receiver gain and signal detection threshold so that signals reflected from the ground surface are effectively ignored and only signals reflected from significant objects in the path of the vehicle are detected. An alarm signal is generated in response to the receiver receiving signals reflected from the object. The system may continuously repeat the cycle of alternating between a self test mode and an object detection mode, or intermittently alternate between the self test mode and object detection mode.

DETAILED DESCRIPTION OF THE ILLUSTRATED EMBODIMENT

Figure 1:
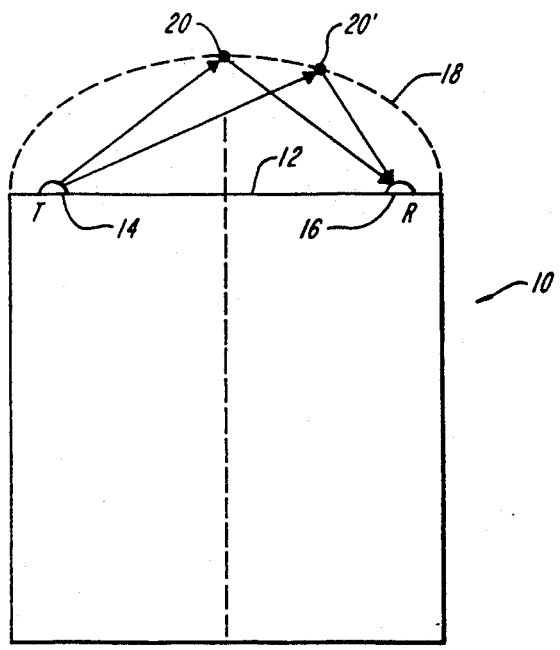
FIG. 1 shows a diagrammatic view of a vehicle shown in plan view, illustrating the position of the transmitter and receiver of the object detection system.

With reference to FIG. 1, there is illustrated a moveable vehicle 10, having an end portion 12, upon which are mounted a transmitter 14 and receiver 16. The transmitter 14 transmits object detection signals, preferably bursts of ultrasonic waves that reflect from an object in the path of the moveable vehicle and are received by the receiver 16. An elliptical path 18, being one of a family of elliptical paths, constitutes the loci of all points having a constant total signal transit time from the transmitter 14 to a reflecting object 20 or 20' and back to the receiver 16. The specific geometry associated with such an object detection system is described in detail in applicants' co-pending U.S. patent application Ser. No. 07/758,244, now U.S. Pat. No. 5,160,927 to Cherry et al. incorporated herein by reference.

Figure 2:
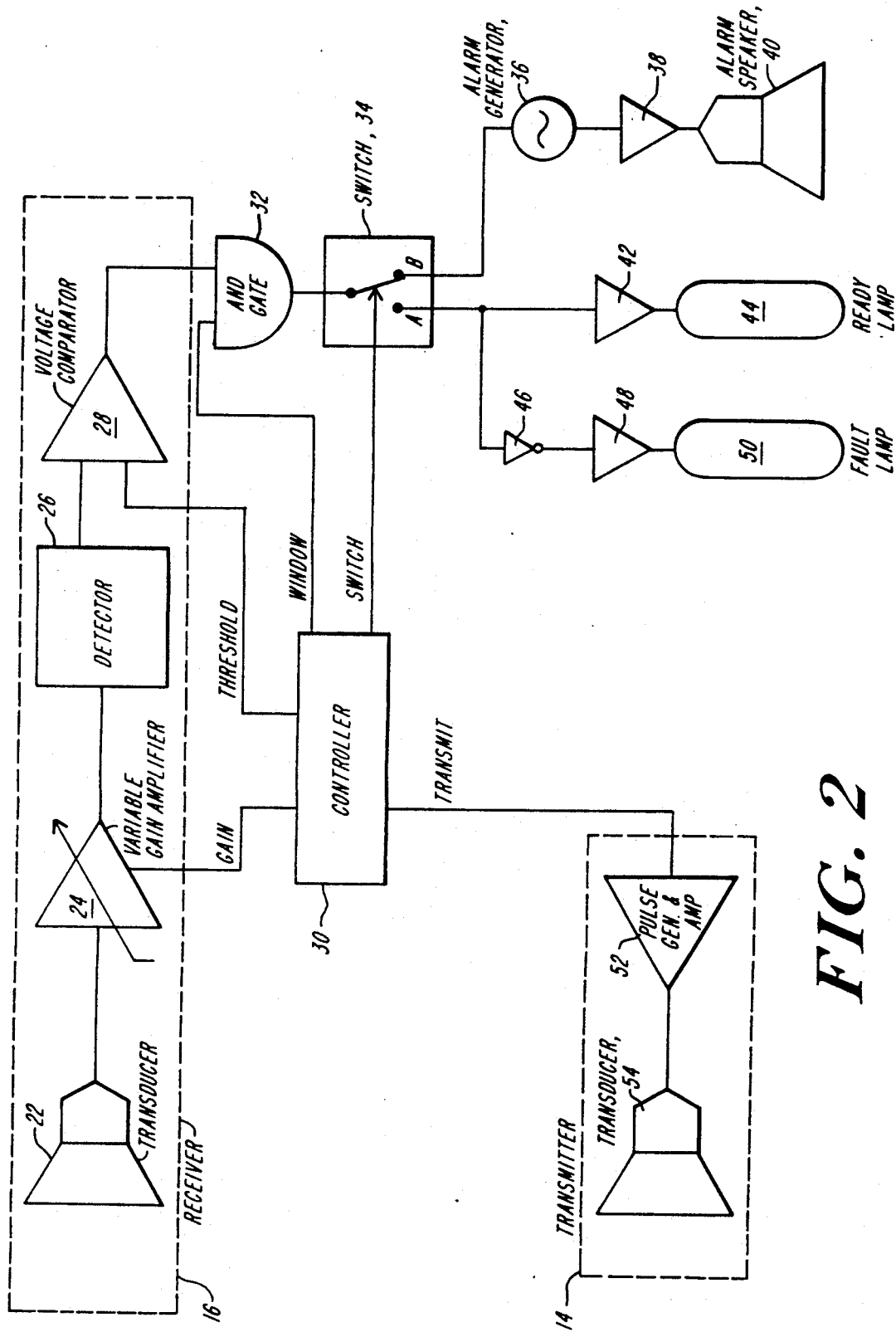
FIG. 2 is a functional block diagram of the object detection system in accordance with the present invention.
Figure 4:
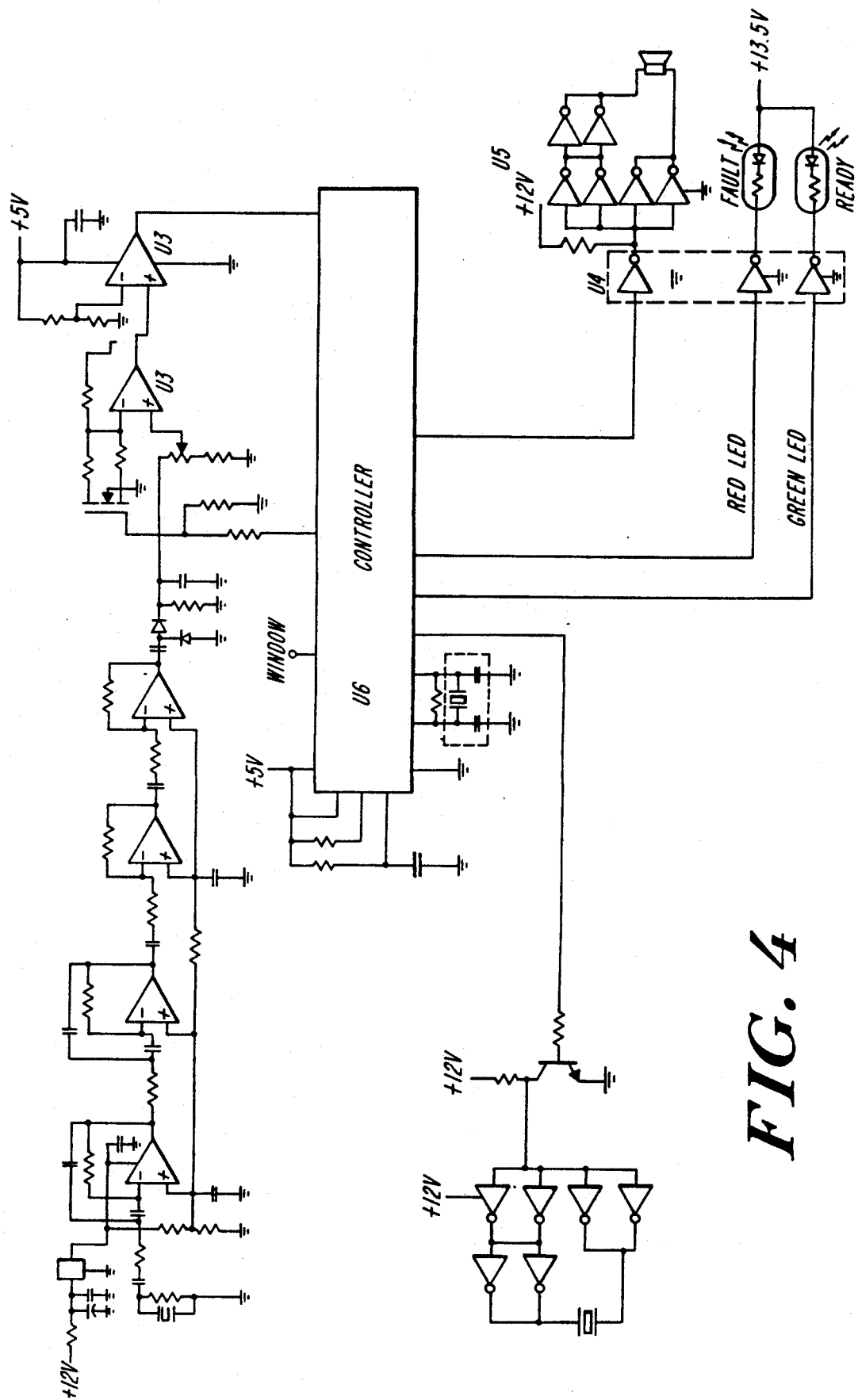
FIG. 4 is a detailed schematic diagram of an exemplary embodiment of the object detection system.

FIG. 2 illustrates a functional block diagram of the object detection system of the present invention, and FIG. 4 illustrates a detailed schematic diagram of an exemplary embodiment of the object detection system. A controller 30, for example a microprocessor, coordinates and controls the operation of the transmitter 14 and the receiver 16 to alternate the system between a self test mode and an obstacle detection mode.

Figure 3:
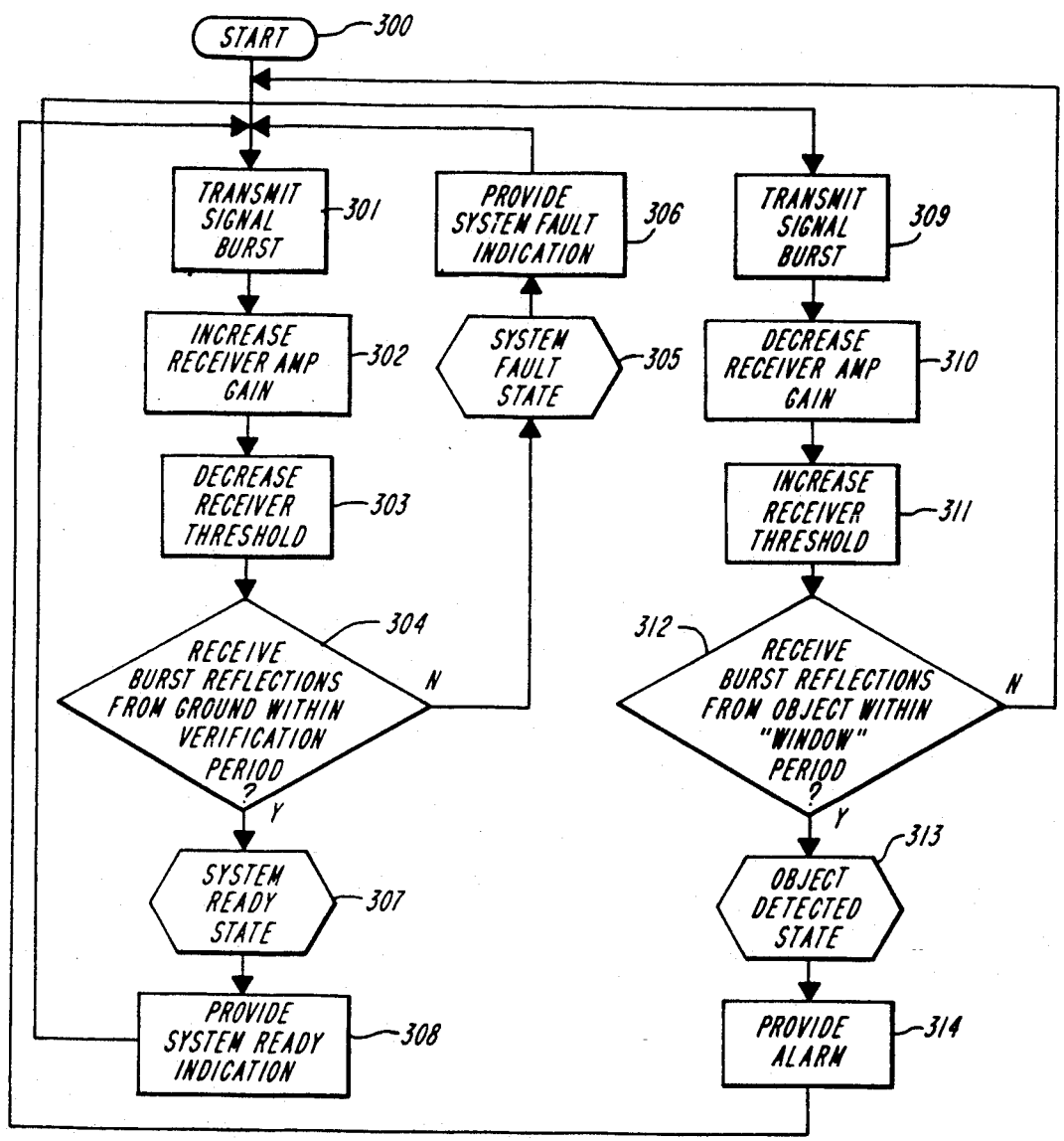
FIG. 3 is a flow chart showing the operation of the object detection system.

With reference now to both FIGS. 2 and 3, the operation of the obstacle detection system in accordance with the present invention is described. As power is initially applied to the system (step 300), the controller 30 controls the transmitter 14 to emit an object detection signal, for example an ultrasonic pulse signal, infrared signal or other like radiation signals. The ultrasonic pulse signal is preferably a 40 KHz, 1 ms burst which is generated by a pulse generator and an amplifier 52 and transmitted by a transducer 54 (step 301). The controller 30 simultaneously adjusts the receiver gain and threshold so that the receiver may detect small reflected signals from the transmitter pulse, including reflections from small irregularities in the ground proximate to the monitored area. Therefore, the controller adjusts the receiver gain by increasing the gain of variable gain amplifier 24 (step 302). The receiver threshold is in turn decreased by providing a low level voltage threshold to voltage comparator 28 (step 303), which will compare the threshold provided by the controller and a threshold of DC pulses which are converted from the reflected bursts of 40 KHz pulse signals by detector 26.

A determination is then made as to whether the receiver 16 has received pulse reflections from the ground within a predetermined verification period (step 304). The output from the voltage comparator 28 is provided to an AND gate 32 with a "window" signal provided by the controller 30. The window signal, e.g. 22 ms, represents the predetermined verification period. When both the output of the voltage comparator 28 and the window signal from the controller 30 are at a "high" or "1" state, the output of the AND gate 32 will also be high or 1. Otherwise, the output of the AND gate 32 is a "low" or "0" state.

Initially, a mode switch 34 is controlled to operate in a switch position A or self test mode. Thus, a high output provided by the AND gate 32 is provided to amplifier 42 in order to illuminate ready lamp 44. In other words, the system has in effect received a reflection from the ground during the verification period, and therefore an indication is provided as to the readiness of the system. If a low output is provided to the AND gate 32, the low or 0 output is inverted by an invertor 46 and provided to an amplifier 48 in order to illuminate a fault lamp 50, thus indicating that a reflection from the ground has not been received during the verification period (steps 305 and 306). Thereafter, the system transmits another signal pulse in order to self test the system once again (step 301).

In the case where the initial self test is satisfactory, i.e., a reflected signal is received within the predetermined verification period, the controller 30 initiates the transmitter 14 to transmit another signal pulse (step 309). The controller simultaneously adjusts the receiver gain and/or receiver threshold so as to reject small reflected signals from the transmitter pulse, including those from small grounds irregularities. The controller operates to decrease the gain of the variable gain amplifier 24 (step 310) and/or further increases the receiver threshold (step 311) by providing a higher voltage threshold to voltage comparator 28. Thus, only larger reflected signals from objects or obstacles of interest will be detected. Once again, the controller 30 creates a window in which the reflected signals from objects should be received by the receiver 16 (step 312). The window signal from the controller is provided to the AND gate 32 along with the output from the voltage comparator 28. The controller switches the mode switch 34 to switch position B or the object detection mode in order to provide high outputs from the AND gate 32 to alarm circuitry. When the output of the AND gate is high, i.e., a reflected a pulse signal of sufficient threshold is received during the window period, an alarm generator 36 provides an alarm signal to amplifier 38 so that an audible alarm is provided by an alarm speaker 40 (steps 313 and 314). Thus, the audible alarm is activated to indicate to the operator that an obstacle is in the monitored zone. If no signals are reflected from an object within the zone, there will be no alarm provided. Thereafter, this sequence may be initiated again with the transmission of a signal pulse to self test the system in a cyclical manner (step 301), or continue in the object detection mode for a predetermined interval.

Figure 5:
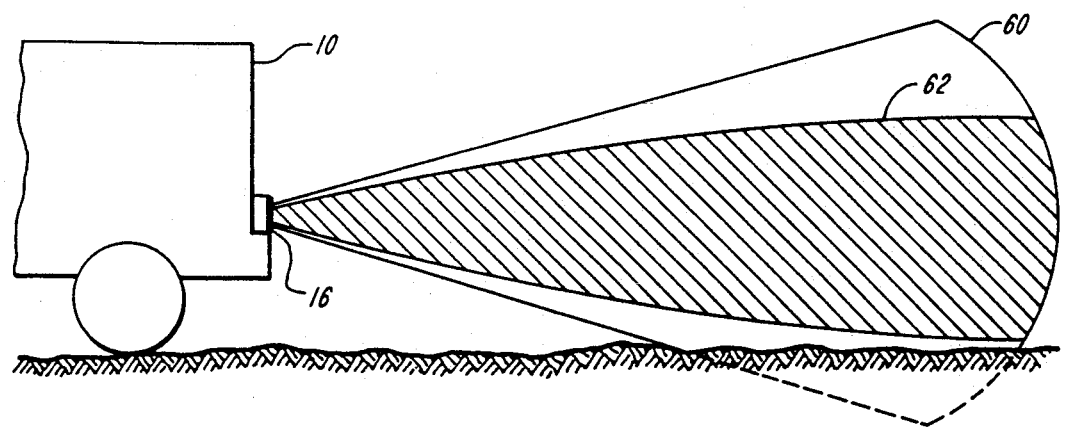
FIG. 5 shows a depiction of the monitored zone as it is increased during the self test mode, and decreased during the object detection mode.

Thereafter, the controller 30 may continuously or intermittently alternate between the self test mode and the obstacle detection mode during system operation. As illustrated in FIG. 5, the monitored zone is increased to a self test zone area 60 during the self test mode so that minor reflections from the ground may be received by the receiver 16, and decreased to an obstacle detection zone area 62 during the obstacle detection mode so that reflections from the ground are effectively ignored by the receiver.

The foregoing description has been set forth merely to illustrate the invention and is not intended to be limiting. Since modifications of the described embodiments incorporating the spirit and substance of the invention may occur to persons skilled in the art, the scope of the invention should be limited solely with reference to the appended claims and equivalents.

What is claimed is:

1. A system for detecting the presence of objects in the proximity of a movable vehicle, said system comprising:

transmitter means for transmitting object detection signals;

receiver means for receiving said object detection signals as first reflected signals reflected from a ground surface on which said vehicle is supported, and for receiving said object detection signal as second reflected signals reflected from an object in the proximity of said movable vehicle;

control means responsive to said receiver means receiving both said first reflected signals and said second reflected signals for generating an alarm signal; and alarm indication means for indicating an alarm condition in response to receiving said alarm signal from said control means.

2. The object detection system of claim 1, wherein said control means varies the gain of a receiver amplifier associated with said receiver means.

3. The object detection system of claim 2, wherein said control means varies the detection threshold at which said receiver means responds to received reflected signals.

4. The object detection system of claim 3, wherein said control means initially sets said detection threshold to a first level so that said receiver means responds to said first reflected signals reflected from said ground surface.

5. The object detection system of claim 4, wherein said control means adjusts said detection threshold to a second level so that said receiver means responds only to a second reflected signal reflected from said object in the proximity of said vehicle in response to said receiver means receiving said first reflected signals.

6. The object detection system of claim 5, wherein when said control means sets said first level of said detection threshold, said control means increases the gain of said receiver amplifier so that said receiver means receives signals reflected from said ground surface.

7. The object detection system of claim 6, wherein when said control means sets said detection threshold to said second level, said control means decreases the gain of said receiver amplifier so that said receiver means does not receive signals reflected from said ground surface.

8. The object detection system of claim 6, wherein when said control means sets said detection threshold to said second level, said control means decreases the gain of said receiver amplifier so that said receiver means does not receive signals reflected from said ground surface.

9. The object detection system of claim 1, further comprising system indication means for indicating whether said system is in a ready state.

10. The object detection system of claim 9, wherein said system indication means provides a system ready indication in response to said receiver means receiving said first reflected signals.

11. The object detection system of claim 10, wherein said system indication means provides a system not ready indication in response to said receiver means failing to receive said first reflected signals.

12. The object detection system of claim 1, wherein said alarm indication means indicates said alarm condition as an audible alarm.

13. The object detection system of claim 1, wherein said alarm indication means indicates said alarm condition as a visual alarm.

14. The method of claim 1, further comprising the steps of indicating whether said system is in a ready state.

15. The method of claim 14, further comprising the steps of providing a system ready indication in response to said receiver receiving said first reflected signals.

16. The method of claim 15, further comprising the steps of providing a system not ready indication in response to said receiver failing to receive said first reflected signals.

17. The method of claim 1, further comprising the steps of indicating said alarm condition as an audible alarm.

18. The method of claim 1, further comprising the steps of indicating said alarm condition as a visual alarm.

19. A method for detecting objects in the proximity of a movable vehicle, said method comprising the steps of:
   transmitting object detection signals from a transmitter;
   receiving said object detection signals as first reflected signals reflected from a ground surface on which said vehicle is supported, and receiving said object detection signals as second reflected signals reflected from an object in the proximity of said movable vehicle at a receiver;
   generating an alarm signal in response to receiving both said first reflected signals and said second reflected signals; and
   indicating an alarm condition in response to said alarm signal being generated.

20. The method of claim 19, further comprising the steps of varying the gain of a receiver amplifier associated with said receiver.

21. The method of claim 20, further comprising the steps of varying the threshold at which said receiver responds to received reflected signals.

22. The method of claim 21, further comprising the steps of initially setting said threshold to a first level so that said receiver responds to said first reflected signals reflected from said ground surface.

23. The method of claim 22, further comprising the steps of adjusting said threshold to a second level so that said receiver responds only to said second reflected signals reflected from said object in the proximity of said vehicle in response to said receiver receiving said first reflected signals.

24. The method of claim 23, further comprising the steps of setting said first level of said threshold and increasing the gain of said receiver amplifier so that said receiver receives signals reflected from said ground surface.

25. The method of claim 24, further comprising the steps of adjusting said threshold to said second level and decreasing the gain of said receiver amplifier so that said receiver does not receive signals reflected from said ground surface.

26. A system for detecting the presence of objects in the proximity of a movable vehicle, said system comprising:
   transmitter means for transmitting object detection signals;
   receiver means for receiving said object detection signals as both first reflected signals reflected from a ground surface on which said vehicle is supported and as second reflected signals reflected from an object in the proximity of said movable vehicle;
   control means responsive to the reception of said first reflected signals from said ground surface for providing a first alarm signal indicative of the operability of said system; and
   alarm indication means responsive to the reception of said second reflected signals from said object for providing a second alarm signal indicative of the detection of said object proximate to said vehicle.

27. The object detection system of claim 26, wherein said control means varies the gain of a receiver amplifier associated with said receiver means.

28. The object detection system of claim 27, wherein said control means varies the detection threshold at which said receiver means responds to received reflected signals.

29. The object detection system of claim 28, wherein said control means initially sets said detection threshold to a first level so that said receiver means responds to said first reflected signals reflected from said ground surface.

30. The object detection system of claim 29, wherein said control means adjusts said detection threshold to a second level so that said receiver means responds only to said second reflected signals reflected from said object in the proximity of said vehicle in response to said receiver means receiving said first reflected signals.

31. The object detection system of claim 30, wherein when said control means sets said first level of said detection threshold, said control means increases the gain of said receiver amplifier so that said receiver means receives signals reflected from said ground surface.

32. The object detection system of claim 31, wherein when said control means sets said detection threshold to said second level, said control means decreases the gain of said receiver amplifier so that said receiver means does not receive signals reflected from said ground surface.

33. The object detection system of claim 26, further comprising system indication means for indicating whether said system is in a ready state.

34. The object detection system of claim 33, wherein said system indication means provides a system ready indication in response to said receiver means receiving said first reflected signals.

35. The object detection system of claim 34, wherein said system indication means provides a system not ready indication in response to said receiver means failing to receive said first reflected signals.

36. The object detection system of claim 26, wherein said alarm indication means indicates said alarm condition as an audible alarm.

37. The object detection system of claim 26, wherein said alarm indication means indicates said alarm condition as a visual alarm.

38. A method for detecting the presence of objects in the proximity of a movable vehicle, said method comprising the steps of:
   providing a transmitter and receiver on said vehicle;
   transmitting object detection signals from said transmitter;
   receiving said object detection signals at said receiver as both first reflected signals reflected from a ground surface on which said vehicle is supported and as second reflected signals reflected from an object in the proximity of said movable vehicle;
   providing a first alarm signal indicative of the operability of said transmitter and receiver in response to the reception of said first reflected signals from said ground surface; and
   providing a second alarm signal indicative of the detection of said object proximate to said vehicle in response to the reception of said second reflected signals from said object.

39. The method of claim 38, further comprising the steps of varying the gain of a receiver amplifier associated with said receiver.

40. The method of claim 39, further comprising the steps of varying the threshold at which said receiver responds to received reflected signals.

41. The method of claim 40, further comprising the steps of initially setting said threshold to a first level so that said receiver responds to said first reflected signals reflected from said ground surface.

42. The method of claim 41, further comprising the steps of adjusting said threshold to a second level so that said receiver response only to said second reflected signals reflected from said object in the proximity of said vehicle in response to said receiver receiving said first reflected signals.

43. The method of claim 42, further comprising the steps of setting said first level of said threshold and increasing the gain of said receiver amplifier so that said receiver receives signals reflected from said ground surface.

44. The method of claim 43, further comprising the steps of adjusting said threshold to said second level and decreasing the gain of said receiver amplifier so that said receiver does not receive signals reflected from said ground surface.

45. The method of claim 44, further comprising the steps of indicating whether said system is in a ready state.

46. The method of claim 45, further comprising the steps of providing a system ready indication in response to said receiver receiving said first reflected signals.

47. The method of claim 46, further comprising the steps of providing a system not ready indication in response to said receiver failing to receive said first reflected signals.

48. The method of claim 38, further comprising the steps of indicating said alarm condition as an audible alarm.

49. The method of claim 38, further comprising the steps of indicating said alarm condition as a visual alarm.

50. A system for detecting the presence of objects in the proximity of a movable vehicle, said system comprising:
   a transmitter for transmitting object detection signals;
   a receiver for receiving said object detection signals as first reflected signals reflected from a ground surface on which said vehicle is supported, and for receiving said object detection signal as second reflected signals reflected from an object in the proximity of said movable vehicle;
   a control circuit operable for varying the detection threshold at which said receiver responds to received reflected signals, said control circuit initially setting said detection threshold to a first level so that said receiver responds to said first reflected signals reflected from said ground surface, and in response to said receiver receiving said first reflected signals adjusting said detection threshold to a second level so that said receiver responds only to said second reflected signals reflected from said object in the proximity of said vehicle, said control circuit being responsive to said receiver receiving both said first reflected signals and said second reflected signals for generating an alarm signal; and
   an alarm indicator for indicating an alarm condition in response to receiving said alarm signal from said control circuit.

51. The object detection system of claim 50, wherein when said control circuit sets said first level of said detection threshold, said control means increases the gain of a receiver amplifier associated with said receiver so that said receiver receives signals reflected from said ground surface.

* * * * *